United States Patent
Se et al.

(10) Patent No.: US 6,963,451 B2
(45) Date of Patent: Nov. 8, 2005

(54) LIGHT DIFFUSIVE SHEET

(75) Inventors: Koichi Se, Osaka (JP); Yutaka Omura, Osaka (JP)

(73) Assignee: Takiron Co., Ltd., Osaka (JP)

(*) Notice: Subject to any disclaimer, the term of this patent is extended or adjusted under 35 U.S.C. 154(b) by 105 days.

(21) Appl. No.: 10/474,806

(22) PCT Filed: Jun. 21, 2002

(86) PCT No.: PCT/JP02/06247

§ 371 (c)(1),
(2), (4) Date: Oct. 14, 2003

(87) PCT Pub. No.: WO03/044572

PCT Pub. Date: May 30, 2003

(65) Prior Publication Data

US 2004/0160673 A1 Aug. 19, 2004

(30) Foreign Application Priority Data

Nov. 22, 2001 (JP) .................................. 2001-357616

(51) Int. Cl.⁷ .............................. G02B 5/02; F21V 7/04
(52) U.S. Cl. ...................... 359/599; 359/613; 359/831; 362/31
(58) Field of Search ................ 359/599, 601–614, 359/453, 495, 707; 362/26–31, 551; 349/57–64, 95–112

(56) References Cited

U.S. PATENT DOCUMENTS

| | | | |
|---|---|---|---|
| 2,660,927 A | * 12/1953 | Burton | ........................ 359/459 |
| 5,289,351 A | 2/1994 | Kashima et al. | ............. 359/589 |
| 5,394,255 A | * 2/1995 | Yokota et al. | ................. 349/64 |
| 5,903,391 A | * 5/1999 | Toshima et al. | ............. 359/599 |
| 5,944,405 A | 8/1999 | Takeuchi et al. | .............. 362/31 |
| 6,280,063 B1 | * 8/2001 | Fong et al. | .................. 362/333 |
| 6,481,864 B2 | * 11/2002 | Hosseini et al. | .............. 362/31 |
| 6,831,714 B2 | * 12/2004 | Masaki et al. | .............. 349/112 |
| 6,845,212 B2 | * 1/2005 | Gardiner et al. | ............ 385/146 |

FOREIGN PATENT DOCUMENTS

| | | |
|---|---|---|
| JP | 63-163454 U | 10/1988 |
| JP | 2562265 B2 | 9/1996 |
| JP | 2665301 B2 | 6/1997 |
| JP | 9-281492 A | 10/1997 |
| JP | 9-304604 A | 11/1997 |
| JP | 11-337711 B2 | 12/1999 |
| JP | 2000-35508 A | 2/2000 |
| JP | 2001-201613 A | 7/2001 |
| JP | 2001-305335 A | 10/2001 |

* cited by examiner

*Primary Examiner*—Thong Q Nguyen
(74) *Attorney, Agent, or Firm*—Sughrue Mion, PLLC

(57) ABSTRACT

The invention provides a sheet (1) comprising a light-transmittable resin, in which irregularities are formed on both sides (1a) and (1b) of the sheet, the average surface roughness of one side (1a) which becomes the light-entering side is from 0.2 to 5.0 μm and larger than the average surface roughness of the opposite side (1b) that becomes the light-departing side, wherein the average surface roughness of the opposite side (1b) is from 0.2 to 2.0 μm, and the surface area ratio of the one side (1a) is smaller than the surface area ratio of the opposite side (1b).

8 Claims, 2 Drawing Sheets

LIGHT DIFFUSIVE SHEET

TECHNICAL FIELD

This invention relates to a light diffusing sheet which is used in liquid crystal display back light units, decorative illumination sign boards, illumination covers, arcades, lighting board, balcony screen boards and the like.

BACKGROUND OF THE INVENTION

General back light unit of liquid crystal display is constructed by a light introducing plate having dots for light diffusion which are printed on its reverse side, a light source (a cold-cathode tube or the like) arranged on one side or both sides of this light introducing plate, a light diffusing sheet superposed on this light introducing plate, a lens film (prism sheet) superposed on this light diffusing sheet or on above and below thereof, and the like.

As such light diffusing sheets, (1) a sheet in which a light diffusing layer containing polymer beads or inorganic particulates as a light diffusing agent is arranged on at least one side of a transparent base material (Japanese Patent No. 2,665,301), (2) a sheet in which an unevenness is formed on one side or both sides of a transparent plastic film by applying embossing thereto and a light diffusing layer containing particulates is also arranged on one side or both sides thereof (JP-A-11-337711), (3) a sheet in which a random irregularity is formed on the surface without containing a light diffusing agent (Japanese Patent No. 2,562,265) and the like are known.

However, the light diffusing sheet of (1) had problems such as insufficient visibility, reduction of displaying quality, high production cost due to poor yield and the like, because the polymer beads or inorganic particulates protruding from the surface of light diffusing layer impair the lens film superposed thereon and are apt to fallout from the light diffusing layer by an impact and the like.

Also, though dispersing ability of the light diffusing sheet of (2) is improved by the irregularity formed on one side or both sides thereof, it had the same problems as those of the light diffusing sheet of (1) because a light diffusing layer containing particulates is arranged on its surface and, in addition, it had another problem of further increasing its production cost because it requires two processes of a irregularity forming process by embossing and a light diffusing layer forming process.

In addition, the light diffusing sheet of (3) had a problem in that when the irregular shape formed on the surface of one side or both sides is not appropriate, the light scattering becomes insufficient or the light scattering becomes heterogeneous to cause partial variation of the brightness or becomes visualization of dots on the light introducing plate face. There was also a problem in that wrinkles are generated on the light diffusing sheet when it is heated by light and heat from the light source, thus resulting in uneven light scattering and varied brightness.

The invention has been made by taking the aforementioned problems into consideration, and an object thereof is to provide an easily producible light diffusing sheet which is rich in the amount of entering light from one side and can emit uniform diffused light with no variation of brightness from the opposite side by controlling optical loss at a small degree. Also, its another object is to provide a light diffusing sheet which does not generate wrinkles when heated by light and heat from the light source and can perform stable and uniform light scattering with less optical loss.

DISCLOSURE OF THE INVENTION

For the purpose of achieving the aforementioned objects, the first light diffusing sheet of the invention is a sheet comprising a light-transmittable resin, in which irregularities are formed on both sides of the sheet, the average surface roughness of one side which becomes the light-entering side is larger than the average surface roughness of the opposite side that becomes the light-departing side, and the surface area ratio of said one side is smaller than the surface area ratio of said opposite side, characterized in that the average surface roughness of said one side is from 0.2 to 5.0 μm, the average surface roughness of said opposite side is from 0.2 to 2.0 μm, the surface area ratio of said one side is from 1.001 to 1.150 and the surface area ratio of said opposite side is from 1.010 to 1.250.

The term "average surface roughness" as used herein means an "averaged value of absolute deviation values from the reference plane to the designated plane" obtained by three-dimensionally expanding the center line average surface roughness Ra defined by the Japanese Industrial Standard JIS B 0601 such that it can be applied to the measuring plane, which is calculated by the following mathematical formula.

$$Ra = \frac{1}{S_0} \int_{Y_B}^{Y_T} \int_{X_L}^{X_R} |F(X, Y) - Z_0| dX dY_p$$

In the formula, Ra corresponds to the average surface roughness, and $S_0$ to reference area of the measuring plane, F(X,Y) to a roughness curve obtained by developing the f(x) defined in JIS B 0601 to the surface, and $Z_0$ to height of the reference plane.

Also, the term "surface area ratio" means a ratio ($S/S_0$) as actual surface area S to area $S_0$ when the measuring plane is assumed to be a flat plane.

For emitting uniform diffused light having no variation of brightness by controlling optical loss to a small degree, it is necessary that a large quantity of light can enter easily into the sheet almost uniformly from one side of the light diffusing sheet and that the light-departing opposite side is excellent in light diffusion action. According to the first light diffusing sheet of the invention, difference of elevation of the irregularity on one side which becomes the light-entering side is larger than that of the irregularity of the opposite side, and distribution density of the irregularity is roughened at the same time, so that a large quantity of light can enter almost uniformly from said one side and interference and diffraction of light can be prevented at the same time, and on the other hand, by allowing difference of elevation of irregularity on the opposite side which becomes the light-departing side to distribute smaller and densely than that of the irregularity of the one side, light diffusion action of the opposite side is improved and optical loss is also reduced by returning the diffused light discharged into outside the panel again into inside of the panel.

That is, according to the first light diffusing sheet of the invention, the average surface roughness of one side that becomes the light-entering side is larger than that of the opposite side and is within the range of from 0.2 to 5.0 μm, and surface area ratio of this one side is smaller than that of the opposite side and is within the range of from 1.001 to 1.150, so that irregularity of this one side has a difference of elevation (size) and distribution density suited for almost uniform entering of light, and because of this, when this light diffusing sheet is superposed for example on a light introducing plate of a back light unit, the majority of the light advancing with appropriately reflecting inside of the light introducing plate enters from entire one side of the sheet into the sheet almost uniformly so that optical loss is less and partial variation of the amount of entering light hardly occurs. In addition, since the average surface roughness Ra of the opposite side that becomes light-departing side of this light diffusing sheet is smaller than that of the aforementioned one side and is within the range of from 0.2 to 2.0 μm, and the surface area ratio of this opposite side is larger than that of the aforementioned one side and is within the range of from 1.010 to 1.250, irregularity of this opposite side is distributed more minutely and densely than the irregularity of the aforementioned one side so that it becomes an irregularity size and the distribution density suited for the scattering of light. Therefore, diffused light having no variation of brightness can be discharged while uniformly and sufficiently diffusing light by the irregularity of this opposite side.

According to the aforementioned light diffusing sheet, the light diffusion becomes more excellent, and more uniform diffused light can be discharged, when the average surface roughness of one side is controlled at from 0.3 to 3.0 μm, and the average surface roughness of the opposite side at from 0.3 to 1.5 μm, the surface area ratio of the one side at from 1.005 to 1.070 and the surface area ratio of the opposite side at from 1.010 to 1.200.

Next, the second light diffusing sheet of the invention is a sheet comprising a light-transmittable resin, in which irregularities are formed on both sides of the sheet, the average surface roughness of one side which becomes the light-entering side is larger than the average surface roughness of the opposite side that becomes the light-departing side, and it contains a light diffusing agent, characterized in that the average surface roughness of said one side is from 0.2 to 5.0 μm, and the average surface roughness of said opposite side is from 0.2 to 2.0 μm.

Since the light entered into the sheet from one side is diffused by the light diffusing agent, light diffusion action of this second light diffusing sheet is improved. Because of this, diffused light having no variation of brightness can be discharged through uniform and sufficient diffusion of light entered from a light introducing plate, when the average surface roughness of the one side which becomes the light-entering side of this light diffusing sheet is from 0.2 to 5.0 μm, and the average surface roughness of the opposite side that becomes the light-departing side is smaller than that of the aforementioned one side, which is within the range of from 0.2 to 2.0 μm. Also, expansion and contraction of the sheet become small due to the light diffusing agent and wrinkles are not generated on the sheet even when it is heated by light from the light source, so that uniform diffused light can be discharged stably.

The light diffusion becomes further excellent without causing inhibition of light transmission when the aforementioned light diffusing agent has a mean particle size of from 0.5 to 50 μm and is contained in the light-transmittable resin in an amount of from 0.1 to 50% by weight. Also, generation of wrinkles can be sufficiently inhibited through reduction of expansion and contraction of the sheet due to heat from the light source, so that stable diffused light can be obtained.

It is desirable that the surface area ratio of one side of the aforementioned second light diffusing sheet is from 1.001 to 1.150 and the surface area ratio of the opposite side is from 1.010 to 1.250, because the entering light becomes more uniform and variation of brightness of the diffused light also becomes further small.

Also, the aforementioned effects are further improved when the average surface roughness of the aforementioned one side is from 1.0 to 3.0 μm, the average surface roughness of the aforementioned opposite side is from 0.5 to 1.5 μm, the surface area ratio of the aforementioned one side is from 1.030 to 1.100 and the surface area ratio of the aforementioned opposite side is from 1.050 to 1.200.

Also, it is desirable to contain 10 to 40% by weight of talc having a mean particle size of from 1.0 to 15 μm as the light diffusing agent in the light-transmittable resin, because wrinkles are not generated even when heated by light from the light source for a prolonged period of time.

In addition, a case in which a light diffusing agent comprising talc and other light diffusing agent is contained in an amount of from 10 to 40% by weight, wherein the aforementioned talc is contained in the light-transmittable resin in an amount of from 5 to 30% by weight and is 50% by weight or more of the total light diffusing agent, is also desirable, because wrinkles are not generated even when heated by light from the light source for a prolonged period of time.

BRIEF DESCRIPTION OF THE DRAWINGS

In this connection, reference numerals 1, 10 and 100 in the drawings are light diffusing sheets, 1a is one side (lower side) which becomes light-entering side, 1b is opposite side (upper side) which becomes light-departing side, 1c is light diffusing agent, 2 is light introducing plate, 3 is lens film (prism sheet), and 4 is light source.

BEST MODE FOR CARRYING OUT THE INVENTION

The following describes illustrative embodiments of the invention based on drawings.

Figure 1:
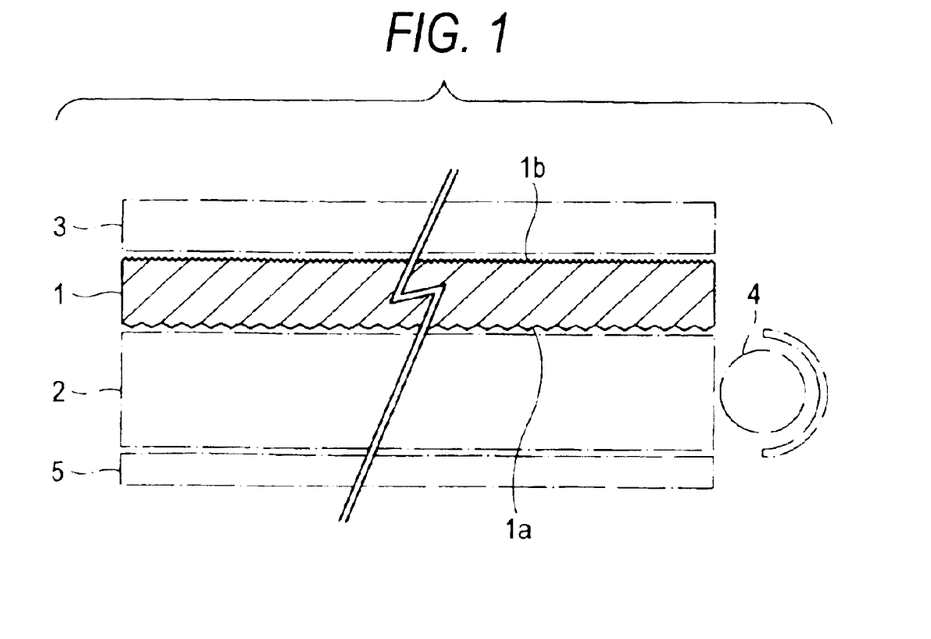
FIG. 1 is a sectional view of a light diffusing sheet according to an embodiment of the invention.

FIG. 1 is a sectional view of a first light diffusing sheet according to an embodiment of the invention.

This light diffusing sheet 1 is a sheet comprising a light-transmittable resin in which irregularities are formed on both sides 1a and 1b of the sheet. As the light-transmittable resin, thermoplastic resins having high total light transmittance such as polycarbonate, polyester, polyethylene, polypropylene, polyolefin copolymer (e.g., poly-4-methylpentene-1 or the like), polyvinyl chloride, cyclic polyolefin (e.g., cyclopolyolefin or the like), acrylic resin, polystyrene, ionomer and the like are desirably used, of which polypropylene is used particularly desirably because of its good heat resistance and softness that render possible reduction of deformation against outgoing radiation from the light source and prevention of scratches on the upper side lens film (prism sheet), when integrated into a liquid crystal display. In addition, a cyclic polyolefin is also used preferably, because it has markedly good transparency and small coefficient of linear expansion so that a sheet having excellent optical characteristics and less thermal deformation can be obtained. In this connection, the light-transmittable resin is a resin having a total light transmittance (by JIS K 7105) of 50% or more when measured using a resin sheet of 0.1 mm in thickness.

The irregularity formed on one side (lower side) 1a which becomes the light-entering side of this light diffusing sheet 1 has a larger difference of elevation and rougher distribution density that those of the irregularity formed on the opposite side (upper side) 1b which becomes the light-departing side. That is, the average surface roughness Ra of this one side 1a is larger than that of the opposite side 1b and is within the range of from 0.2 to 5.0 μm, and its surface area ratio ($S/S_0$) is smaller than that of the opposite side 1b and is within the range of from 1.001 to 1.150.

On the contrary, the irregularity formed on the opposite side (upper side) 1b which becomes the light-departing side is distributed minutely and densely in comparison with the irregularity formed on the aforementioned one side 1a, its average surface roughness Ra is smaller than that of the one side 1a and is within the range of from 0.2 to 2.0 μm, and its surface area ratio ($S/S_0$) is larger than that of the one side 1b and is within the range of from 1.010 to 1.250.

Since such a light diffusing sheet 1 shows a total light transmittance of 94% or more (thickness 110 μm) and a haze value of from 60 to 95%, it can be made into a sheet which can transmit light with good diffusion. In this connection, the total light transmittance and the haze value are values measured based on the Japanese Industrial Standard JIS K 7105.

Such a light diffusing sheet 1 can be produced efficiently by, e.g., a method in which a thermoplastic resin material (blended with various additives as occasion demands) is extrusion-molded into a film or a sheet and then irregularities are formed on both sides of the sheet with upper and lower embossing rollers having different emboss sizes. Known methods other than this can also be employed, such as formation of a film or sheet by pressing it with pressing plates having irregularities, and application of a coating and subsequent formation of irregularities by interposing said coat layer between upper and lower embossing rollers. In this connection, thickness of the sheet is not limited, but in the case of a light diffusing sheet to be used in the back light unit of a liquid crystal display, it is desirable to form it into a thickness of approximately from 0.025 to 1 mm.

Since irregularity of the one side 1a of the light diffusing sheet 1 has a difference of elevation (size) and a distribution density which are suited for the entering of light as has been described in the foregoing, when the aforementioned light diffusing sheet 1 is superposed on a light introducing plate 2, a lens film 3 is superposed thereon and then light is entered into the light introducing plate 2 from a light source 4 beside the light introducing plate 2 side as shown in FIG. 1, the light advancing inside the light introducing plate 2 appropriately repeating reflection and light-departing enters into the light diffusing sheet 1 almost uniformly from the entire one side 1a of the sheet 1, so that optical loss is reduced and, at the same time, partial variation of the amount of entering light is hardly generated. In addition, since irregularity of the opposite side 1b of this sheet 1 has a irregularity size and distribution density suited for the scattering of light by distributing more finely and densely than that of the irregularity of aforementioned one side 1a, the light entered into the light diffusing sheet 1 is sufficiently diffused by the irregularity of this opposite side 1b, and more uniform diffused light is discharged toward the lens film 3. Accordingly, dots on the surface of light introducing plate 2 become invisible and partial variation of brightness is not generated. In this connection, 5 is a reflection sheet to be used for effecting entering again of the light departing downward from the light introducing plate 2 into the light introducing plate 2.

When the average surface roughness Ra of the one side 1a of the sheet is less than 0.2 μm by becoming smaller than that of the opposite side 1b and the surface area ratio ($S/S_0$) of the one side 1a of the sheet exceeds 1.150 by becoming larger than that of the opposite side 1b, irregular reflection at the one side 1a of the sheet is increased to cause dissipation of light from the edge of the light introducing plate 2 and the like, so that amount of light entering into the sheet 1 is decreased and the brightness is reduced. Also, when the average surface roughness Ra of the one side 1a of the sheet is less than 0.2 μm and the surface area ratio ($S/S_0$) is less than 1.001, the light advanced from the light source 4 into the light introducing plate 2 is hardly mirror-reflected and not propagated toward far side by mirror reflection, and optical deficiency by interference, diffraction and the like of light is also generated, because air layer between said one side 1a and light introducing plate 2 becomes extremely thin, so that a large quantity of light is entered into the sheet 1 from a moiety of the light introducing plate 2 close to the light source 4 and the brightness of this moiety becomes high, but on the contrary, variation of brightness is generated on the whole because only slight quantity of light enters into the sheet 1 from a moiety of the light introducing plate 2 distant from the light source and brightness of the moiety therefore is reduced. In addition, being too close to the light introducing plate, reduction of indicated qualities such as blurring of colors due to interference of light and the like are generated.

On the other hand, when the average surface roughness Ra of the opposite side 1b of the sheet 1 becomes larger than 2.0 μm and the surface area ratio ($S/S_0$) becomes smaller than 1.010, starting points for light diffusion become less so that maldistribution of diffused light components occurs and uniform surface emission becomes difficult.

Particularly, when the aforementioned average surface roughness Ra of the one side 1a of the sheet is controlled at from 0.3 to 3.0 μm and its surface area ratio at from 1.005 to 1.070, and the average surface roughness Ra of the opposite side 1b of the sheet is controlled at from 0.3 to 1.5 μm and its surface area ratio at from 1.010 to 1.200, light incidence performance and light diffusion performance of said sheet 1 are markedly improved and sufficiently diffused light is discharged from the opposite side 1b of the sheet, so that it does not cause reduction of the brightness and becomes uniform diffused light and does not generate variation in the brightness.

In this connection, a light diffusing sheet 1 having irregularities whose tips have roundness is preferably used, because lens film 3 is hardly damaged when said lens film is superposed thereon. Also, there is a using method for improving the effects by superposing two sheets of the light diffusing sheet 1 interposing the lens film 3 between them.

Figure 2:
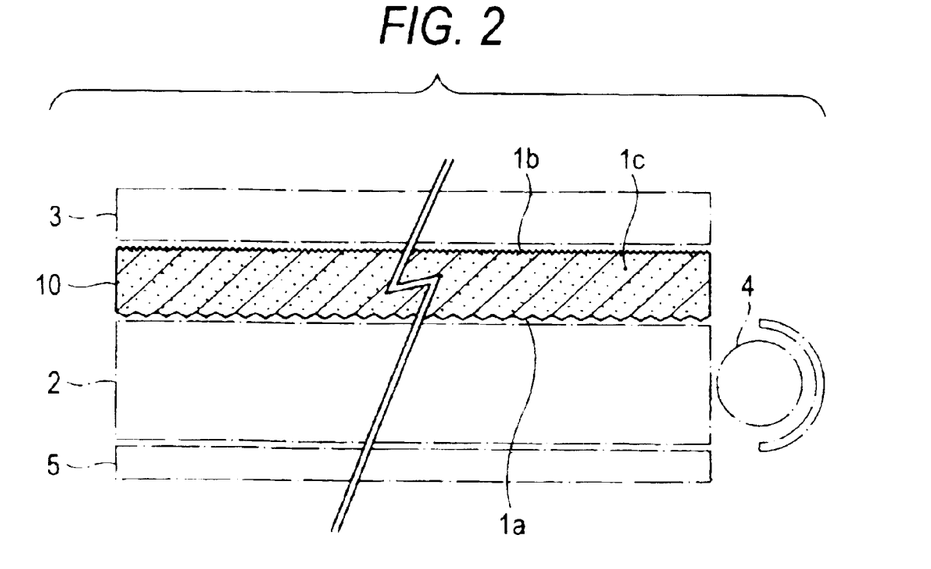
FIG. 2 is a sectional view of a light diffusing sheet according to another embodiment of the invention.

FIG. 2 is a sectional view of a second light diffusing sheet according to another embodiment of the invention.

According to this light diffusing sheet 10, a light diffusing agent 1c is uniformly dispersed and contained in a light-transmittable resin, and irregularities are formed on both sides 1a and 1b of the sheet. As this light-transmittable resin, the resin to be used in the aforementioned embodiment is appropriately used. In addition, the irregularities formed on both sides of the light diffusing sheet 10 have a average surface roughness Ra and a surface area ratio ($S/S_0$) similar to the case of the aforementioned embodiment. That is, the average surface roughness Ra of one side 1a which becomes plane of incidence is set to a level larger than that of the opposite side 1b that becomes the light-departing plane, and the surface area ratio ($S/S_0$) of said one side 1a is set to a level smaller than the surface area ratio ($S/S_0$) of the opposite side 1b. The average surface roughness Ra of this one side 1a is from 0.2 to 5.0 μm, the average surface roughness Ra of the opposite side 1b is from 0.2 to 2.0 μm, the surface area ratio (S/S$_0$) of the one side is from 1.001 to 1.150 and the surface area ratio (S/S$_0$) of the opposite side 1b is from 1.010 to 1.250.

On the other hand, the light diffusing agent 1c is contained for the purpose of improving diffusion of light and also of preventing generation of wrinkles through the inhibition of thermal expansion and contraction of the sheet 10, and its useful examples include beads of a light-transmittable synthetic resin having different index of refraction from that of the light-transmittable resin constituting the sheet 10, and inorganic particles having no difference in index of refraction from that of the light-transmittable resin, or the difference in index of refraction is 0.1 or less, or having such a particle diameter that they are larger than the wavelength of light and do not inhibit transmission of light or fine powder of metal particles. Examples of such a light diffusing agent 1c include acrylic beads, styrene beads, benzoguanamine and the like organic polymer fine particles, silica, mica, synthetic mica, calcium carbonate, magnesium carbonate, balium sulfate, talc, montmorillonite, kaolin clay, bentonite, hectorite, whisker, glass beads and the like inorganic particles, and titanium oxide, zinc oxide, alumina and the like metal oxide fine particles, which may be used alone or as a combination of two or more.

The aforementioned light diffusing agent 1c to be used has a mean particle diameter of from 0.1 to 100 μm, preferably from 0.5 to 50 μm, most preferably from 1 to 15 μm. When the particle diameter is smaller than 0.1 μm, their dispersion is poor due to their aptness to cause aggregation, and even if they can be uniformly dispersed, scattering efficiency becomes poor due to larger wavelength of light. Because of this, particles having a size of approximately 0.5 m or more or further 1.0 μm or more are desirable. Also, when the particle diameter is larger than 100 μm, light scattering becomes irregular, light transmittance is reduced and particles become visible, which are not desirable, and diffusion becomes poor due to reduced number of particles. Because of this, particles having a size of 50 μm or less, or further 15 μm or less, are desirable.

Though it is desirable to adjust containing amount of the light diffusing agent 1c to a level of from 0.05 to 50% by weight, preferably from 0.1 to 50% by weight, most preferably from 10 to 40% by weight, it is optionally changed in response to the kind of light diffusing agent to be used and the quality required for the light diffusing sheet. When the content is smaller than 0.05% by weight, light diffusion efficiency cannot be expected, and thermal expansion and contraction inhibitory effect cannot be expected too. Because of this, the content is 0.1% by weight or more, more preferably 10% by weight or more. On the other hand, when the content is larger than 50% by weight, the transmitted amount of light becomes small due to absorption and reflection by particles and the display through the light diffusing sheet can hardly be seen, so that mechanical strength and the like qualities are reduced to a level which cannot withstand the use. Because of this, it is desirable to adjust the content to 40% by weight or less.

When silica is used as the light diffusing agent 1c, it is desirable to uniformly contain from 0.1 to 40% by weight of silica having a mean particle diameter of from 0.5 to 50 μm, preferably from 3 to 35% by weight of silica having a mean particle diameter of from 1 to 15 μm. According to this silica-containing light diffusing sheet 10, its total light transmittance becomes almost the same as the case of a sheet which does not contain a light diffusing agent, and its haze value also becomes high, so that it can be used in a liquid crystal display back light unit, a decorative illumination sign board, an arcade, a lighting board or a balcony screen board, as a light diffusing sheet which transmits light properly and is excellent in concealing property.

Also, when talc is used as the light diffusing agent 1c, it is desirable to uniformly contain from 5 to 50% by weight of talc having a mean particle diameter of from 0.5 to 50 μm, preferably from 10 to 40% by weight of talc having a mean particle diameter of from 1 to 15 μm. According to the light diffusing sheet 10 containing this talc light diffusing agent, its thermal expansion and contraction is greatly inhibited so that expansion of the light diffusing sheet 10 is small even when it is heated by the heat of light source 4, and even when the light diffusing sheet 10 is used by fixing it, generation of wrinkles can be inhibited for a long period of time. However, its haze value is slightly inferior to that of the silica-containing sheet, but there is no hindrance as a light diffusing sheet for liquid crystal display back light units.

Also, when talc and silica are jointly used as the light diffusing agent 1c, it is desirable to use them in such amounts that their total content becomes 5 to 50% by weight, preferably 10 to 40% by weight, and at the same time, the ratio of talc occupying the total content becomes 50% by weight or more. It is desirable that this joint use light diffusing agent 1c uniformly contains 5 to 30% by weight of talc having a mean particle diameter of from 0.5 to 50 μm and 2 to 15% by weight of silica having a mean particle diameter of from 0.1 to 50 μm, preferably 5 to 12% by weight of talc having a mean particle diameter of from i.0 to 20 m and 10 to 20% by weight of silica diffusion agent having a mean particle diameter of from 1 to 20 μm. According to this light diffusing sheet containing both talc and silica, its thermal expansion and contraction is greatly inhibited by talc and the light diffusion effect is multiplied by silica, so that it becomes a sheet having good total light transmittance and good haze value and small thermal expansion and contraction, its elongation is small even when heated by the heat of light source 4, and generation of wrinkles can be prevented even when the light diffusing sheet 10 is fixed.

In addition, when talc and calcium carbonate are jointly used as the light diffusing agent 1c, it is desirable to use them in such amounts that their total content becomes 5 to 50% by weight, preferably 10 to 40% by weight, and at the same time, the ratio of talc occupying the total content becomes 50% by weight or more. It is desirable that this joint use light diffusing agent 1c uniformly contains 5 to 30% by weight of talc having a mean particle diameter of from 0.5 to 50 μm and 2 to 15% by weight of calcium carbonate having a mean particle diameter of from 0.1 to 50 μm, preferably 10 to 25% by weight of talc having a mean particle diameter of from 1 to 20 μm and 5 to 12% by weight of calcium carbonate having a mean particle diameter of from 0.5 to 2.0 μm. According to this light diffusing sheet 10 containing both talc and calcium carbonate, its thermal expansion and contraction is greatly inhibited by talc and the moldability is improved by calcium carbonate and by such synergistic effects, a sheet which has small thermal expansion and contraction and hardly generates wrinkles can be produced with good productivity.

According to the light diffusing sheet 10 in which the light diffusing agent 1c is contained in the above manner, the light entered into the sheet 10 from the one side 1a is diffused by the light diffusing agent 1c too, in addition to the aforementioned effects by the irregularities on both sides of the sheet, so that the light diffusion action is further improved in addition to an advantage in that generation of wrinkles is prevented through the inhibition of thermal expansion and contraction of the sheet 10 effected by the light diffusing agent 1c.

In addition, since both sides of the sheet have irregularities even when the light diffusing agent 1c is added, the light diffusing agent 1c does not contact with a lens film and the like by projecting from the surface, and fallout of the light diffusing agent 1c can also be prevented.

Figure 3:
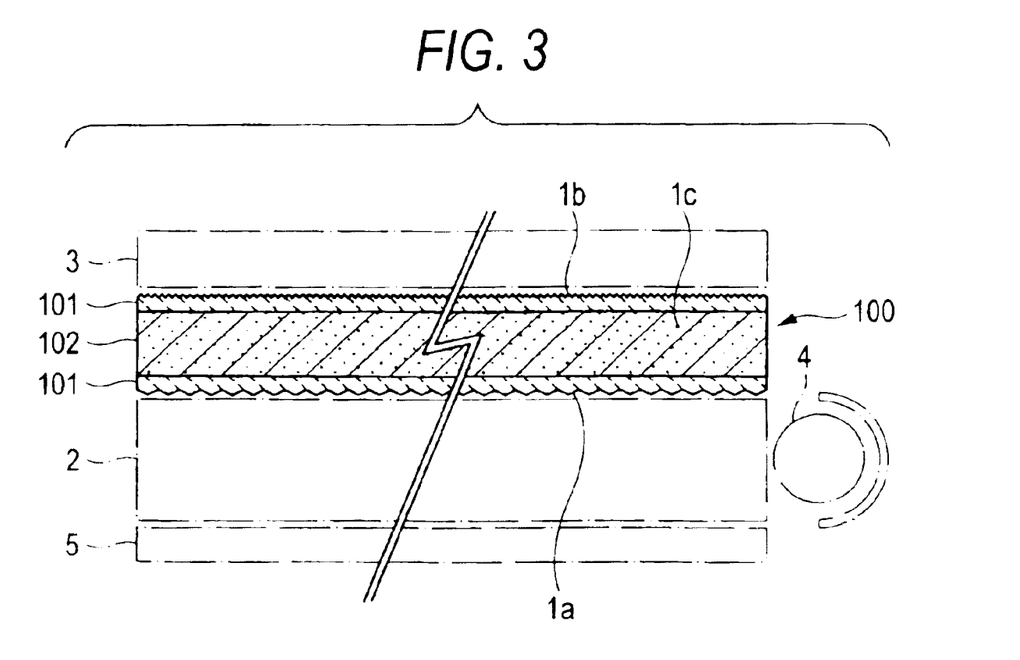
FIG. 3 is a sectional view of a light diffusing sheet according to still another embodiment of the invention.

FIG. 3 is a sectional view of a second light diffusing sheet according to still another embodiment of the invention.

In this light diffusing sheet 100, light-transmittable resin surface layers 101 and 101 are laminated on both sides of a light diffusing layer 102. The light diffusing layer 102 is prepared by including a light diffusing agent 1c in a light-transmittable resin similar to the light diffusing sheet 10 of the aforementioned embodiment but having a difference in that irregularity is not formed on the surface of the light diffusing layer 102. Since other conditions are identical to those of the light diffusing sheet 10, their descriptions are omitted.

Each of the surface layers 101 and 101 has a thickness of from 1 to 10 μm, and the same light-transmittable resin used in the light diffusing layer 102 or other light-transmittable resin is used therein. Though it is desirable that the surface layer 101 does not contain a light diffusing agent, the light diffusing agent 1c may be contained in an amount smaller than the content in the light diffusing layer 102.

Irregularities are formed on the surfaces 1a and 1b of this surface layer 101, and the irregularities have the same average surface roughness and the surface area ratio of the aforementioned embodiment. That is, the average surface roughness Ra of one side 1a which becomes the plane of incidence is larger than the average surface roughness Ra of the opposite side 1b which becomes the light-departing plane, and the surface area ratio $(S/S_0)$ of said one side 1a is smaller than the surface area ratio $(S/S_0)$ of the opposite side 1b. The average surface roughness Ra of this one side 1a is within the range of from 0.2 to 5.0 μm, the average surface roughness Ra of the opposite side 1b is within the range of from 0.2 to 2.0 μm, the surface area ratio $(S/S_0)$ of the one side is from 1.001 to 1.150 and the surface area ratio $(S/S_0)$ of the opposite side 1b is from 1.010 to 1.250.

In preparing such a light diffusing sheet 100, it can be produced efficiently by a method in which a mixture for light diffusing layer comprising a light-transmittable resin and a light diffusing agent 1c and a mixture for surface layer comprising a light-transmittable resin are co-extruded using co-extrusion molding techniques and then irregularities are formed on both surfaces of the sheet by co-extruding with upper and lower embossing rollers having different emboss sizes.

Since this light diffusing sheet 100 hardly stains die lip of the co-extrusion mold at the time of its extrusion molding, it is excellent in terms that it can be produced efficiently.

Also, since the light diffusing agent 1c is completely absent or exists in a small amount on the surface of this light diffusing sheet 100, fallout of the light diffusing agent 1c can be prevented. This effect is further improved by the irregularity on the surface.

In this connection, irregularity is formed only on the surface layer 101 in FIG. 3, but when said irregularity is large, irregularity is formed not only on the surface layer 101 but also on the light diffusing layer 102.

EXAMPLES

Next, further illustrative examples of the invention are described.

Inventive Example 1

A light diffusing sheet having irregularities on both sides was prepared by extrusion-molding a polypropylene resin into a sheet of 110 μm in thickness and then passing it through upper and lower embossing rollers having different emboss sizes.

When center line average surface roughness Ra of the above light diffusing sheet was measured within a measuring range of 230.6×175.4 μm using a WYKO surface shape measuring apparatus NT-2000 (mfd. by WYKO), the average surface roughness Ra of one side which becomes the plane of incidence was 0.445 μm and the average surface roughness Ra of the opposite side which becomes light-departing plane was 0.305 μm.

Also, when surface area ratio $(S/S_0)$ was calculated by measuring surface area of the above light diffusing sheet within a measuring range of 400×400 μm using a probe microscope (using Nanopics 1000 controller and NPX 100 head mfd. by Seiko Instruments), surface area ratio of the one side was 1.0064 and surface area ratio of the opposite side was 1.0239.

Next, when total light transmittance and haze value of the above light diffusing sheet were measured using a haze meter (HGM-2DP mfd. by Suga Test Instruments), its total light transmittance was 95.0% and haze value was 62.4%.

In addition, the aforementioned light diffusing sheet was put on a light introducing plate of back light unit for liquid crystal display use, and a liquid crystal panel was further put on this. When brightness was measured by lighting the light source and arranging a luminance meter nt-1° p manufactured by MINOLTA at a distance of 22 cm from the light diffusing sheet, it was 94.3 cd/m$^2$. Also, when concealment of dots on the back side of the light introducing plate was observed at the same time with the naked eye, dots were completely concealed and invisible so that its dot concealing property was good.

Inventive Example 2

A light diffusing sheet having irregularities on both sides was prepared in the same manner as in Inventive Example 1, except that upper and lower embossing rollers having emboss sizes different from those of the embossing rollers of Inventive Example 1 were used.

When average surface roughness Ra, surface area ratio $(S/S_0)$, total light transmittance, haze value, brightness and dot concealing property of this light diffusing sheet were measured in the same manner as in Inventive Example 1, the average surface roughness Ra of one side which becomes the light-entering side was 0.642 μm, the average surface roughness Ra of the opposite side which becomes light-departing side was 0.322 μm, the surface area ratio of the one side was 1.0077, the surface area ratio of the opposite side was 1.0385, the total light transmittance was 95.1%, the haze value was 64.5%, the brightness was 96.4 cd/m$^2$ and the dot concealing property was good.

Measured results of the above Inventive Examples 1 and 2 are summarized and described in the following Table 1.

Comparative Examples 1 to 4

The following four light diffusing sheets having irregularities on both sides were prepared in the same manner as in Inventive Example 1, except that upper and lower embossing rollers having different emboss sizes were used.

(1) A light diffusing sheet in which average surface roughness Ra of one side is 0.321 μm and average surface roughness Ra of the opposite side is 0.052 μm (surface area ratio was not measured), (2) a light diffusing sheet in which average surface roughness Ra of one side is 0.331 μm and average surface roughness Ra of the opposite side is 0.328 μm (surface area ratio was not measured), (3) a light diffusing sheet in which average surface roughness Ra of one side is 0.394 μm, average surface roughness Ra of the opposite side is 0.286 μm, surface area ratio of one side is 1.0043 and surface area ratio of the opposite side is 1.0141, and (4) a light diffusing sheet in which average surface roughness Ra of one side is 1.248 μm, average surface roughness Ra of the opposite side is 1.007 μm, surface area ratio of one side is 1.0032 and surface area ratio of the opposite side is 1.0068.

Total light transmittance, haze value, brightness and dot concealing property of these light diffusing sheets (1) to (4) were measured in the same manner as in Inventive Example 1, with the results also shown in the following Table 1.

It can be seen also that the light diffusing sheet of Comparative Example 3 in which the surface area ratios of both sides satisfy the conditions of the invention but the average surface roughness of the opposite side (light-departing side) does not satisfy the conditions of the invention, and the light diffusing sheets of Comparative Examples 3 and 4 in which the average surface roughness of both sides satisfy the conditions of the invention but the surface area ratio of the opposite side does not satisfy the conditions of the invention, also have low brightness and poor dot concealing property.

Inventive Examples 3 to 8

Light diffusing sheets having irregularities on both sides of each sheet were prepared by adding silica light diffusing agents having mean particle diameters of 4 μm and 8 μm (Sylophobic 505 and 4004, mfd. by Fuji Silysia Kagaku) to the polypropylene resin used in Inventive Example 1 in respective amounts of 1.5% by weight, 2.5% by weight, 5% by weight and 10% by weight as shown in the following Table 2, uniformly mixing them, and then extrusion-molding

TABLE 1

| | Average surface roughness (μm) | | Surface area ratio | | | | | |
|---|---|---|---|---|---|---|---|---|
| | One side (light-entering side) | Opposite side (light-departing side) | One side (light-entering side) | Opposite side (light-departing side) | Total light transmittance (%) | Haze value (%) | Brightness (cd/m$^2$) | Dot concealing property |
| Inv. Ex. 1 | 0.445 | 0.305 | 1.0064 | 1.0239 | 95 | 62.4 | 94.3 | ○ |
| Inv. Ex. 2 | 0.642 | 0.322 | 1.0077 | 1.0385 | 95.1 | 64.5 | 96.4 | ○ |
| Comp. Ex. 1 | 0.321 | 0.052 | — | — | 93.2 | 86.5 | 72.7 | X |
| Comp. Ex. 2 | 0.331 | 0.328 | — | — | 93.4 | 91.3 | 74.8 | X |
| Comp. Ex. 3 | 0.394 | 0.286 | 1.0043 | 1.0141 | 94.2 | 53.3 | 80.3 | X |
| Comp. Ex. 4 | 1.248 | 1.007 | 1.0032 | 1.0068 | 89.4 | 20.2 | 70.5 | X |

In this connection, o in Table 1 indicates that dots were not visible because of good dot concealing property, and X indicates that dots were visible due to poor dot concealing property.

It can be seen from this Table 1 that the light diffusing sheets of Inventive Examples 1 and 2 of the invention, in which average surface roughness of one side (light-entering side) is larger than that of the opposite side (light-departing side), surface area ratio of the one side is smaller than that of the opposite side, average surface roughness of the one side is within the range of from 0.3 to 5.0 μm, average surface roughness of the opposite side is within the range of from 0.3 to 1.5 μm, surface area ratio of the one side is within the range of from 1.001 to 1.080 and surface area ratio of the opposite side is within the range of from 1.010 to 1.250, have a high total light transmittance of 95% or more, appropriate haze values of 62.4% and 64.5%, and a high brightness of 94 cd/m$^2$ or more, and their dot concealing property is also good.

Contrary to this, it can be seen that, though average surface roughness of one side (light-entering side) is larger than that of the opposite side (light-departing side), the light diffusing sheet of Comparative Example 1 in which the average surface roughness of the opposite side is lower than the range of from 0.3 to 1.5 μm, and the light diffusing sheet of Comparative Example 2 in which the average surface roughness values of both sides are substantially the same, have good total light transmittance and haze values but have low brightness of 72.7 cd/m$^2$ and 74.8 cd/m$^2$ and their dot concealing property is also poor.

the mixture into a sheet of 110 μm in thickness using embossing rollers different from the embossing rollers used in Inventive Example 1. In this case, as Comparative Example 5, a light diffusing sheet having the same thickness but not containing the above light diffusing agent was prepared using the same embossing rollers.

Total light transmittance and haze value of these light diffusing sheets were measured in the same manner as in Inventive Example 1, and average surface roughness and surface area ratio of some of these light diffusing sheets were measured in the same manner as in Inventive Example 1, with summary of the measured results shown in the following Table 2. In addition, coefficient of linear expansion (60 to 65° C.) of each light diffusing sheet of Inventive Examples 7 and 8, and Comparative Example 5 was measured using an apparatus for thermomechanical analysis, TMA-50, manufactured by Shimadzu Corp. (programming rate of 5° C./min by a tensile mode of 5 g loading), and modulus of tensile elasticity at 60° C. was also measured on the light diffusing sheets of Inventive Examples 4, 7 and 8 and Comparative Example 5, with the results also shown in Table 2. This modulus of tensile elasticity is shown as a storage modulus of elasticity measured using a dynamic viscoelasticity apparatus RSA manufactured by Rheometric Scientific F. E. In addition, each light diffusing sheet was cut into a predetermined size (19.6 cm×14.0 cm) and allowed to stand for 10 days in a thermo-hygrostat maintained at a temperature of 60° C. and a humidity of 90%, under such a state that it was fixed at three points, namely central position of the cross direction of one side and both ends of the cross direction of other side, and then conditions of the light diffusing sheet were observed with the naked eye, with the results also shown in Table 2. In this connection, o in Table 2 indicates no generation of wrinkles, Δ indicates slight generation of wrinkles around the fixed parts and X indicates generation of wrinkles on the sheet.

which a light diffusing agent of 8 μm in mean particle diameter is formulated have high modulus of tensile elasticity at a high temperature of 60° C., are resistant against deformation and further have rigidity, so that it can be understood that they are sheets hardly generating wrinkles by 10 days of the thermo-hygrostat test.

TABLE 2

| | Light diffusing agent | | Total light transmittance (%) | Haze value (%) | Average surface roughness (μm) | | Surface area ratio | | Coefficient of linear expansion (60 to 65° C.) (× $10^{-5}/°$ C.) | Presence of wrinkles | Modulus of tensile elasticity (MPa) (60° C.) |
|---|---|---|---|---|---|---|---|---|---|---|---|
| | Particle diameter (μm) | Amount (wt %) | | | One side | Opposite side | One side | Opposite side | | | |
| Inv. Ex. 3 | 4 | 1.5 | 100 | 87.6 | — | — | — | — | — | X | — |
| Inv. Ex. 4 | 4 | 2.5 | 100 | 90.3 | — | — | — | — | — | Δ | 227 |
| Inv. Ex. 5 | 8 | 1.5 | 100 | 90.7 | — | — | — | — | — | Δ | — |
| Inv. Ex. 6 | 8 | 2.5 | 100 | 91.0 | — | — | — | — | — | ○ | — |
| Inv. Ex. 7 | 8 | 5 | 100 | 91.4 | 1.530 | 1.289 | 1.053 | 1.102 | 30.1 | ○ | 264 |
| Inv. Ex. 8 | 8 | 10.0 | 100 | 92.3 | 1.503 | 1.126 | 1.056 | 1.153 | 30.7 | ○ | 490 |
| Comp. Ex. 5 | — | — | 100 | 86.5 | 0.231 | 0.376 | 1.014 | 1.004 | 50.9 | X | 196 |

According to this Table 2, total light transmittance of the light diffusing sheets of Inventive Examples 3 to 8 and the light diffusing sheet of Comparative Example 5 showed the same value of 100%. The reason for this was considered to be due to strong light scattering of each sheet, which caused repeated measurement of scattered light reflected when total light transmittance was measured with a haze meter. On the other hand, while haze value of the sheet of Comparative Example 5 was 86.5%, those of the sheets of Inventive Examples 3 to 8 were 87.6 to 92.3% which were 1.1 to 5.8% higher than the former case, thus finding that the latter ones are light diffusing sheets having good light transmittance and excellent light diffusion property. Particularly, haze values of the sheets of Inventive Examples 5 and 6 in which a light diffusing agent of 8 μm in mean particle diameter was formulated were 3.1% and 0.7% higher than those of the sheets of Inventive Examples 3 and 4 in which the same amount of a light diffusing agent of 4 μm in mean particle diameter was added, and haze values of the sheets of Inventive Examples 5 to 8 in which a light diffusing agent of 8 μm in mean particle diameter was formulated were 4.2 to 5.8% higher than that of the sheet of Comparative Example 5, thus showing that a substance having a mean particle diameter of 8 μm is superior as the light diffusing agent. It can be understood from this that proper mean particle diameter of the light diffusing agent is approximately from 5 to 15 μm.

Also, values of the coefficient of linear expansion of the sheets of Inventive Examples 7 and 8 are smaller than that of the sheet of Comparative Example 5 by a factor of $20.8 \times 10^{-5}/°$ C. and $20.2 \times 10^{-5}/°$ C., respectively, thus showing that the former are sheets which hardly generate wrinkles due to small elongation even when heated by the heat of light source. Also, according to the 10 days of wrinkle generation test in a thermo-hygrostat, generation of wrinkles was improved excluding the case of the sheet of Inventive Example 3, and generation of wrinkles was not found particularly on the sheets of Inventive Examples 6, 7 and 8, thus showing that wrinkles are not generated even when heated with the light source. In this connection, it can be understood also from this wrinkle generation test that proper particle diameter of the light diffusing agent is 8 μm. In addition, the sheets of Inventive Examples 7 and 8 in It can be understood from these results that the light diffusing sheets containing a silica light diffusing agent are sheets which have good light transmittance and excellent light diffusion and concealing properties and which also have small thermal expansion and contraction of the sheets and do not generate wrinkles.

Inventive Examples 9 and 10

Light diffusing sheets having irregularities on both sides of each sheet were prepared by using a polypropylene resin having different melt index (MI value) and crystallinity from those of the polypropylene resin used in Inventive Example 1, adding thereto the silica used in Inventive Example 5 having a mean particle diameters of 8 μm in respective amounts of 16% by weight and 21% by weight as shown in the following Table 3, uniformly mixing them, and then extrusion-molding the mixture into a sheet of 130 μm in thickness using the embossing rollers used in Inventive Examples 3 to 8.

Total light transmittance and haze value of these light diffusing sheets were measured in the same manner as in Inventive Example 1, with the measured results shown together in the following Table 3. Also, coefficient of linear expansion (20 to 25° C.) of each light diffusing sheet was measured using an apparatus for thermomechanical analysis apparatus, TMA-8140C, manufactured by Rigaku Denki, and modulus of tensile elasticity at 20° C. was also measured using DMS6100 manufactured by Seiko Instruments as a storage modulus of elasticity of dynamic viscoelasticity, with the results also shown in Table 3. Also, each light diffusing sheet was put on a light introducing plate of back light unit for liquid crystal display use, and brightness was measured by lighting the light source and arranging a luminance meter nt-1° p manufactured by MINOLTA at a distance of 20 cm from the light diffusing sheet. At the same time, concealment of dots on the back side of the light introducing plate was observed with the naked eye. In addition, each light diffusing sheet was cut into a predetermined size (19.6 cm×14.0 cm) and allowed to stand in a thermo-hygrostat maintained at a temperature of 60° C. and a humidity of 90%, under such a state that it was fixed at three points in the same manner as in Inventive Example 7, and conditions of the light diffusing sheet were observed with the naked eye at an interval of two days to obtain the wrinkle-generated time (wrinkle generation time test). The results are also shown in the following Table 3.

Comparative Example 6

Using the same polypropylene resin of Inventive Example 9, a sheet having the same thickness but not containing the light diffusing agent-was prepared in the same manner as in Inventive Example 9 and used as Comparative Example 6. Respective measurements on total light transmittance, haze value, coefficient of linear expansion, brightness, concealment of dots, wrinkle generation time test and modulus of tensile elasticity were carried out on this Comparative Example 6 in the same manner as in Inventive Example 9. The results are also shown in Table 3.

Inventive Examples 11 to 13

Using the polypropylene resin used in Inventive Example 9, light diffusing sheets having irregularities on both sides of each sheet were prepared by preparing a mixture by adding 30% by weight of talc having a mean particle diameter of 5 μm (Micro Ace K-1, mfd. by Nippon Talc) to the resin and uniformly mixing them, and a mixture by respectively adding 15% by weight and 30% by weight of the aforementioned talc having a mean particle diameter of 8 μm thereto and uniformly mixing them, and then extrusion-molding the mixtures into respective sheets of 130 μm in thickness using the embossing rollers used in Inventive Example 9.

Respective measurements on the total light transmittance, haze value, coefficient of linear expansion, brightness, concealment of dots, wrinkle generation time test and modulus of tensile elasticity were carried out on these light diffusing sheets in the same manner as in Inventive Example 9. The results are also shown in Table 3.

Inventive Examples 14 and 15

Using the polypropylene resin used in Inventive Example 9, a light diffusing sheet having irregularities on both sides was prepared and used as Inventive Example 14, by adding 16% by weight of the talc having a mean particle diameter of 8 μm used in Inventive Example 12 and 8% by weight of the silica having a mean particle diameter of 8 μm used in Inventive Example 9 and uniformly mixing them, and then extrusion-molding the mixture into a sheet of 130 μm in thickness using the embossing rollers used in Inventive Example 9.

Also, using the polypropylene resin used in Inventive Example 9, a light diffusing sheet having irregularities on both sides was prepared and used as Inventive Example 15, by adding 10% by weight of talc having a mean particle diameter of 8 μm (Micro Ace K-1, mfd. by Nippon Talc) and 5% by weight of calcium carbonate having a mean particle diameter of 0.8 μm to the resin and uniformly mixing them, and then extrusion-molding the mixture into a sheet of 130 μm in thickness using the embossing rollers used in Inventive Example 9.

Respective measurements on the total light transmittance, haze value, coefficient of linear expansion, brightness, concealment of dots, wrinkle generation time test and modulus of tensile elasticity were carried out on these light diffusing sheets in the same manner as in Inventive Example 9. The results are also shown in Table 3.

TABLE 3

| | Light diffusing agent | | | | | | | | | | | | |
|---|---|---|---|---|---|---|---|---|---|---|---|---|---|
| | Silica | | Talc | | Calcium carbonate | | | | Coefficient | | | Wrinkle | Modulus |
| | Particle diameter (μm) | Amount (wt %) | Particle diameter (μm) | Amount (wt %) | Particle diameter (μm) | Amount (wt %) | Total light transmittance (%) | Haze value (%) | of Linear expansion (20 to 25° C. × $10^{-5}$/° C.) | Brightness (cd/m²) | Concealment of Dots *3 | generation time test (hour) | of tensile elasticity (MPa) (20° C.) |
| Inv. Ex. 9 | 8 | 16 | — | — | — | — | 100 | 92.8 | 10.9 | 1333 | X | 96 | 1800 |
| Inv. Ex. 10 | 8 | 21 | — | — | — | — | 100 | 93.4 | 9.3 | 1328 | X | 144 | — |
| Inv Ex. 11 | — | — | 5 | 30 | — | — | 100 | 93.9 | 5 | 1309 | ◯ | 144 | 2590 |
| Inv. Ex. 12 | — | — | 8 | 15 | — | — | 100 | 90 | 7.3 | 1342 | ◯ | 120 | — |
| Inv. Ex. 13 | — | — | 8 | 30 | — | — | 100 | 85.9 | 5.5 | 1334 | ◯ | 432 | 2920 |
| Inv. Ex. 14 | 8 | 8 | 8 | 16 | — | — | 100 | 93.8 | 6.7 | 1360 | ◯ | 288 | 1595 |
| Inv. Ex. 15 | — | — | 8 | 10 | 0.8 | 5 | 93.9 | 92.9 | 8.5 | 1308 | ◯ | 96 | 1182 |
| Comp. Ex. 6 | — | — | — | — | — | — | 100 | 85.5 | 14 | 1365 | X | 24 | 1020 |

According to this Table 3, total light transmittance of the light diffusing sheets of Inventive Examples 9 to 15 and the light diffusing sheet of Comparative Example 6 showed the same value of 100%. On the other hand, while haze value of the sheet of Comparative Example 6 was 85.5%, those of the sheets of Inventive Examples 9, 10, 11, 14 and 15 were 92.8 to 93.8% which were 7.3 to 8.3% higher than the former case, thus finding that the latter ones are light diffusing sheets having good light transmittance and excellent concealing property. Also, haze values of Inventive Examples 12 and 13 were low in comparison with other Inventive Examples, but Inventive Example 12 was 5% higher than Comparative Example 6 and Inventive Example 13 showed almost the same haze value of Comparative Example 6, so that reduction of haze value by the addition of the light diffusing agent was not found.

Also, values of the coefficient of linear expansion of the light diffusing sheets of Inventive Examples 9 to 15 were greatly reduced by a factor of 3.1 to $9.0 \times 10^{-5}/°$ C. in comparison with that of Comparative Example 6, thus showing that the former are sheets which hardly generate wrinkles due to small elongation when heated by heat. Particularly, this value was greatly reduced in Inventive Examples 11 to 15 which used talc in comparison with Inventive Examples 9 and 10 which used silica, thus showing that wrinkles are hardly generated even under severe conditions. In addition, according to the wrinkle generation time test in a thermo-hygrostat, the generation time of wrinkles was greatly slowed 96 to 432 hours in comparison with the 24 hours of Comparative Example 6, thus showing that it was markedly improved. Particularly, Inventive Examples 12 to 14 which used talc of 8 μm in mean particle diameter showed values superior to other Inventive Examples in terms of the coefficient of linear expansion and the wrinkle generation time test, thus showing that talc is a light diffusing agent superior to other light diffusing agents. Particularly, the sheet of Inventive Example 13 which contained 30% by weight of talc having a mean particle diameter of 8 μm generated wrinkles when it was left alone for 432 hours, thus showing that wrinkles were not generated for a period of about 18 times longer than that of Comparative Example 6. Consequently, it can be understood that Inventive Examples 12 to 14, particularly Inventive Example 13, which used talc having a mean particle diameter of 8 μm do not generate wrinkles by further severe practical use.

Also, brightness of Inventive Examples 9, 10, 12, 13 and 14 which used light diffusing agents having a mean particle diameter of 8 μm showed almost the same value of Comparative Example 6, so that it can be understood that they are light sheets having less optical loss.

In addition, according to the concealment of dots, Inventive Examples 11 to 15 which used talc are excellent in the concealment of dots, while Comparative Example 6 and Inventive Examples 9 and 10 are poor in the concealment of dots, thus showing that talc has excellent concealment among the light diffusing agents.

Based on the above results, the light diffusing sheet which uses talc as a light diffusing agent is a sheet that does not generate wrinkles because of small expansion and contraction by heat and has excellent concealing ability, so that it is particularly useful as a light diffusing sheet of a liquid crystal display back light unit. Also, a sheet which uses silica has high haze value and is useful as a light diffusing sheet that particularly requires optical characteristics.

While the invention has been described in detail and with reference to specific embodiments thereof, it will be apparent to one skilled in the art that various changes and modifications can be made therein without departing from the spirit and scope of the invention.

This application is based on a Japanese patent application filed on Nov. 22, 2001 (Japanese Patent Application No. 2001-357616), the entire contents thereof being thereby incorporated by reference.

INDUSTRIAL APPLICABILITY

As is evident from the above descriptions, the light diffusing sheet of the invention can control optical loss at a small degree by increasing amount of entering light from one side and can emit uniform diffused light with no variation of brightness from the opposite side, so that it exerts significant effect of being able to produce it with good concealing ability.

Also, since concealing ability of the light diffusing sheet containing a light diffusing agent can be improved by increasing its haze value, and generation of wrinkles can be controlled because the sheet hardly expands and contracts when heated, it can be used suitably in a liquid crystal display back light unit and the like.

Particularly, since the light diffusing sheet which uses talc as a light diffusing agent does not generate wrinkles for a prolonged period of time, it can be used as a light diffusing sheet of a liquid crystal display back light unit.

What is claimed is:

1. A light diffusing sheet comprising a light-transmittable resin, in which irregularities are formed on both sides of the sheet, the average surface roughness of one side which becomes the light-entering side is larger than the average surface roughness of the opposite side that becomes the light-departing side, and the surface area ratio of said one side is smaller than the surface area ratio of said opposite side, characterized in that the average surface roughness of said one side is from 0.2 to 5.0 μm, the average surface roughness of said opposite side is from 0.2 to 2.0 μm, the surface area ratio of said one side is from 1.001 to 1.150 and the surface area ratio of said opposite side is from 1.010 to 1.250.

2. The light diffusing sheet described in claim 1, characterized in that the average surface roughness of said one side is from 0.3 to 3.0 μm, the average surface roughness of said opposite side is from 0.3 to 1.5 μm, the surface area ratio of said one side is from 1.005 to 1.070 and the surface area ratio of said opposite side is from 1.010 to 1.200.

3. A light diffusing sheet as a sheet comprising a light-transmittable resin, in which irregularities are formed on both sides of the sheet, the average surface roughness of one side which becomes the light-entering side is larger than the average surface roughness of the opposite side that becomes the light-departing side, and it contains a light diffusing agent, characterized in that the average surface roughness of said one side is from 0.2 to 5.0 μm, and the average surface roughness of said opposite side is from 0.2 to 2.0 μm.

4. The light diffusing sheet described in claim 3, characterized in that the light diffusing agent has a mean particle diameter of from 0.5 to 50 μm and is contained in the light-transmittable resin in an amount of from 0.1 to 50% by weight.

5. The light diffusing sheet described in claim 3, characterized in that the surface area ratio of said one side is smaller than the surface area ratio of said opposite side, and the surface area ratio of said one side is from 1.001 to 1.150 and the surface area ratio of said opposite side is from 1.010 to 1.250.

6. The light diffusing sheet described in claim 3, characterized in that the average surface roughness of said one side is from 1.0 to 3.0 μm, the average surface roughness of said opposite side is from 0.5 to 1.5 μm, the surface area ratio of said one side is from 1.030 to 1.100 and the surface area ratio of said opposite side is from 1.050 to 1.200.

7. The light diffusing sheet described in claim 3, characterized in that the light diffusing agent is talc having a mean particle diameter of from 1.0 to 15 μm and contained in the light-transmittable resin in an amount of from 10 to 40% by weight.

8. The light diffusing sheet described in claim 3, characterized in that a light diffusing agent comprising talc and other light diffusing agent is contained in an amount of from 10 to 40% by weight, wherein said talc is contained in the light-transmittable resin in an amount of from 5 to 30% by weight and is 50% by weight or more of the total light diffusing agent.

* * * * *